(12) United States Patent
Won et al.

(10) Patent No.: US 11,420,572 B2
(45) Date of Patent: Aug. 23, 2022

(54) POWER RELAY ASSEMBLY

(71) Applicant: AMOGREENTECH CO., LTD., Gimpo-si (KR)

(72) Inventors: Min-Ho Won, Incheon (KR); Seung Jae Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 473 days.

(21) Appl. No.: 16/486,643

(22) PCT Filed: Mar. 6, 2018

(86) PCT No.: PCT/KR2018/002637
§ 371 (c)(1),
(2) Date: Aug. 16, 2019

(87) PCT Pub. No.: WO2018/164449
PCT Pub. Date: Sep. 13, 2018

(65) Prior Publication Data
US 2020/0055466 A1 Feb. 20, 2020

(30) Foreign Application Priority Data

Mar. 6, 2017 (KR) .................. 10-2017-0028393
Mar. 5, 2018 (KR) .................. 10-2018-0025986

(51) Int. Cl.
| | | |
|---|---|---|
| *H01H 45/04* | (2006.01) |
| *B60R 16/02* | (2006.01) |
| *H01H 45/12* | (2006.01) |
| *H01H 50/22* | (2006.01) |
| *H02G 5/00* | (2006.01) |
| *H01H 50/12* | (2006.01) |

(52) U.S. Cl.
CPC ............ *B60R 16/02* (2013.01); *H01H 45/04* (2013.01); *H01H 45/12* (2013.01); *H01H 50/22* (2013.01); *H02G 5/00* (2013.01); *H01H 50/12* (2013.01)

(58) Field of Classification Search
CPC .... B60R 16/02; B60R 16/0238; H01H 45/04; H01H 45/12; H01H 50/22; H01H 50/12; H01H 50/047; H01H 50/02; H01H 2050/225; H02G 5/00
See application file for complete search history.

(56) References Cited

FOREIGN PATENT DOCUMENTS

| | | | | |
|---|---|---|---|---|
| JP | H0515355 U | * | 2/1993 | ........... H01R 13/648 |
| JP | 2000115956 | | 4/2000 | |
| JP | 2001298294 | | 10/2001 | |
| JP | 2001298294 A | * | 10/2001 | ............... H05K 9/00 |
| JP | 2002299132 | | 10/2002 | |
| JP | 2004022705 | | 1/2004 | |
| JP | 2005142256 | | 6/2005 | |
| JP | 2013093303 | | 5/2013 | |
| KR | 20110001013 | | 1/2011 | |

(Continued)

Primary Examiner — Jung Kim
(74) Attorney, Agent, or Firm — Cantor Colburn LLP

(57) ABSTRACT

Provided is a power relay assembly. The power relay assembly comprises: a support plate having at least one electrical element mounted on one surface thereof and including a plastic material having a heat dissipation property and insulation property; at least one bus bar electrically connected to the electrical element; and an electromagnetic wave shielding unit for shielding electromagnetic waves generated from the electrical element.

13 Claims, 9 Drawing Sheets

(56) References Cited

FOREIGN PATENT DOCUMENTS

| KR | 20110078990 | | 7/2011 | | |
|---|---|---|---|---|---|
| KR | 101278229 | | 6/2013 | | |
| KR | 20130136240 | | 12/2013 | | |
| KR | 20140095320 | | 8/2014 | | |
| KR | 1020140095320 A | * | 8/2014 | ................ | H02J 7/00 |
| KR | 20140118601 | | 10/2014 | | |

* cited by examiner

POWER RELAY ASSEMBLY

TECHNICAL FIELD

The present invention relates to a power relay assembly, and more specifically, to a power relay assembly that can be used in, for example, an electric vehicle.

BACKGROUND ART

An electric vehicle is a generic term for vehicles driven using electricity. Generally, electric vehicles are classified into electric vehicles (EV) driven by only electricity, hybrid electric vehicles (HEV) using electricity and fossil fuel, and the like.

In an electric vehicle, a power relay assembly is located between a high-voltage battery and a motor. The above-described power relay assembly serves to selectively supply power from the high-voltage battery.

That is, the power relay assembly includes a main relay, a pre-charge relay, a pre-charge resistor, and the like, and the above-described components are electrically connected to each other through a bus bar.

The main relay supplies or blocks the power between the high-voltage battery and the motor, and the pre-charge relay and the pre-charge resistor prevent damage to an apparatus due to initial current.

Further, the bus bar is a conductor having low impedance and large current capacity, and can individually connect at least two circuits or can connect several equivalence points in one system.

Generally, the power relay assembly is installed in a trunk or a cabin room in order to be connected to the high-voltage battery installed in the trunk. Accordingly, the heat dissipation performance and electromagnetic wave shielding performance of the main relay or the pre-charge relay should be secured to prevent performance degradation and damage due to heat and a malfunction and damage due to electromagnetic waves.

DISCLOSURE

Technical Problem

The present invention is directed to providing a power relay assembly capable of simultaneously securing heat dissipation performance and an electromagnetic wave shielding function.

Technical Solution

One aspect of the present invention provides a power relay assembly including: a support plate having at least one electrical element mounted on one surface thereof and including a plastic material having a heat dissipation property and an insulation property; at least one bus bar electrically connected to the electrical element; and an electromagnetic wave shielding unit configured to shield electromagnetic waves generated from the electrical element.

Further, the electromagnetic wave shielding unit may be a plate-like metal member buried in the support plate, and the metal member may be electrically connected to the ground through a cable.

As another example, the electromagnetic wave shielding unit may be a shielding coating layer having electrical conductivity. In this case, the shielding coating layer may be formed on an inner surface of a cover configured to prevent exposure of the bus bar to the outside.

As still another example, the support plate may include a first plate formed of a plastic material having a heat dissipation property and an insulation property, and a second plate formed of a plastic material having a non-insulation property and a heat dissipation property and including a conductive filler, the second plate being stacked on one surface of the first plate, and the electromagnetic wave shielding unit may be the second plate.

Further, at least a portion of the bus bar may be buried in the support plate. In this case, the bus bar may be disposed so that at least a portion of the bus bar buried in the support plate may come into contact with a portion of the support plate formed of the plastic material having a heat dissipation property and an insulation property.

Advantageous Effects

According to the present invention, it is possible to prevent performance degradation and damage due to heat by adding a heat dissipation property to a support plate, and, a malfunction of and damage to electronic components due to the electromagnetic waves can be prevented by shielding electromagnetic waves through an electromagnetic wave shielding unit.

MODES OF THE INVENTION

Figure 1:
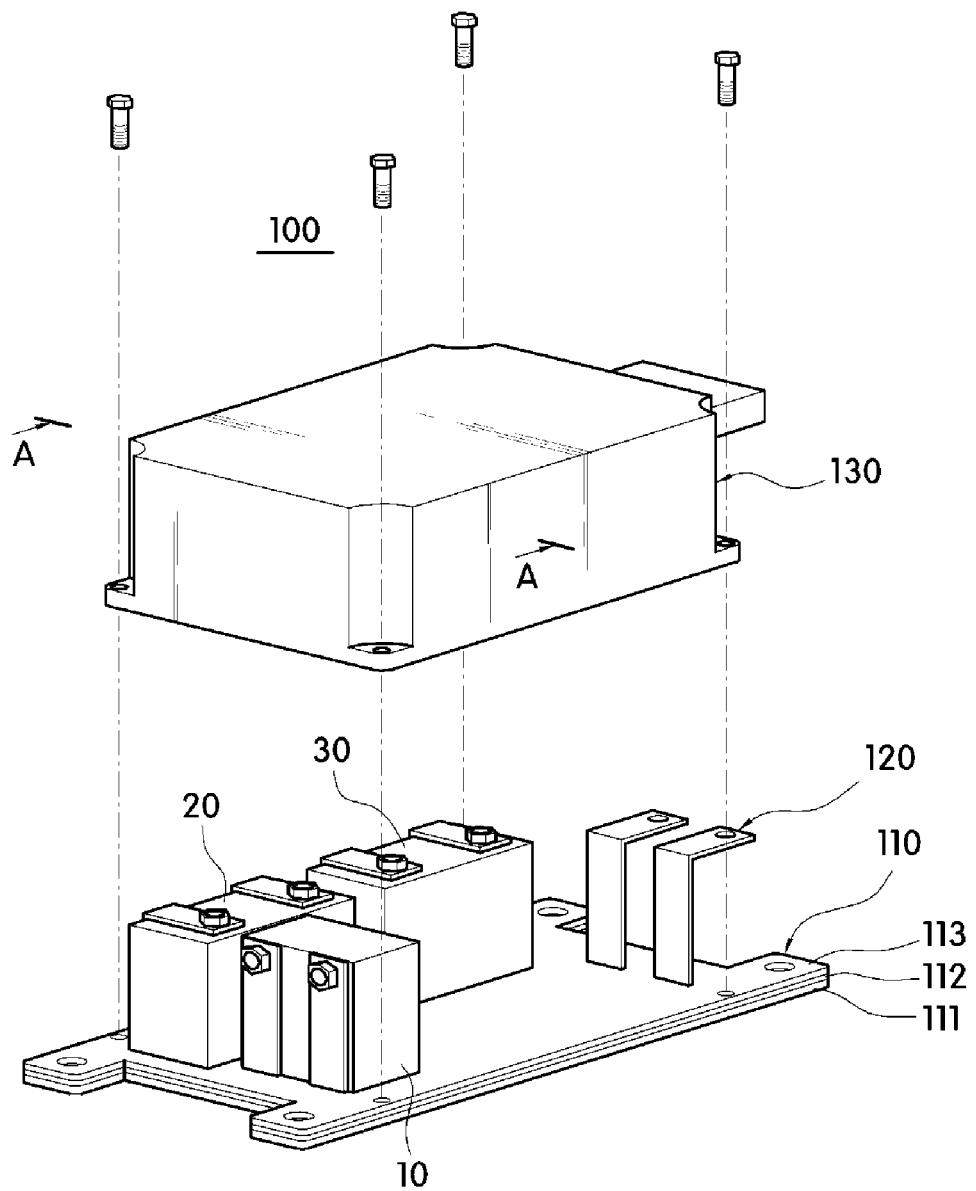
FIG. 1 is a schematic view illustrating a power relay assembly according to one embodiment of the present invention.

Hereinafter, exemplary embodiments of the present invention will be described in detail with reference to the accompanying drawings which may allow one of ordinary skill in the art to easily carry out the present invention. The present invention may be implemented in various forms and is not limited to the following embodiments. Components not related to the description are not included in the drawings to clearly describe the present invention, and the same reference symbols are used for the same or similar components in the description.

A power relay assembly 100 according to one embodiment of the present invention is provided to supply power to a driving control part configured to block or connect a high-voltage current supplied from a battery to control a driving voltage, and as shown in FIG. 1, may include a support plate 110, at least one electrical element 10, 20, or 30, bus bar 120, a cover 130, and an electromagnetic wave shielding unit.

The support plate 110 may have a plate shape having a predetermined area and may fix the at least one electrical element 10, 20, or 30 and the bus bar 120 configured to electrically connect the electrical elements 10, 20, and 30.

In this case, at least a portion of the support plate 110 may have both a heat dissipation property and an insulation property.

That is, in the support plate 110, a portion having a heat dissipation property may serve to support the electrical elements 10, 20, and 30 and the bus bar 120, and may dissipate heat generated when the electrical elements are operated. Further, in the support plate 110, a portion having an insulation property may prevent an electrical short circuit between the bus bar 120 and the electrical elements 10, 20, and 30.

The support plate 110 may be formed of a plastic material, and according to one embodiment of the present invention, at least a portion of the support plate 110 may be formed of a plastic material having a heat dissipation property and an insulation property, and portion of the bus bar 120 may be fixed to the above-described portion having a heat dissipation property and an insulation property to come into contact with each other.

As described above, the support plate 110 may be partially formed of a plastic material having a heat dissipation property and an insulation property, but is not limited thereto, and may be entirely formed of a plastic material having a heat dissipation property and an insulation property.

The bus bar 120 may electrically connect the at least one electrical element 10, 20, or 30 mounted on one surface of the support plate 110.

To this end, the bus bar 120 may be formed of a conductor having low impedance and large current capacity, and may serve to separately connect at least two electrical elements or connect several equivalence points to distribute power to various positions.

The above-described bus bar 120 may be provided in a plate-like bar shape having a predetermined length. Further, the bus bar 120 may have a shape in which a portion of the entire length is bent once or multiple times to be easily fastened to the electrical elements 10, 20, and 30. However, the overall shape of the bus bar 120 is not limited to the above and may be appropriately changed according to arrangement locations of the electrical elements 10, 20, and 30 that are desired to be connected to each other.

The plurality of bus bars 120 may be provided. Accordingly, at least some of the plurality of bus bars 120 may be connected to plus and minus terminals of the battery and plus and minus terminals of an inverter, and the plurality of electrical elements 10, 20, and 30 may block or connect the high-voltage current supplied from the battery to the driving control part.

In this case, at least a portion of the bus bar 120 may be fixed while being in contact with the support plate 110, and the portion of the bus bar 120 which comes into contact with the support plate 110 may be a portion of the support plate 110 having a heat dissipation property.

Accordingly, when the power relay assembly 100 according to one embodiment of the present invention is operated, heat generated from the electrical elements 10, 20, and 30 and/or the bus bars 120 may be dissipated to the outside through the portion of the support plate 110 having a heat dissipation property through the bus bar 120 which comes into contact with the support plate 110. Accordingly, the power relay assembly 100 according to one embodiment of the present invention may prevent performance degradation and damage due to the heat.

In this case, the bus bar 120 may have a form in which one surface is fixed to one surface of the support plate 110, or at least a part of the entire length of the bus bar 120 may be buried in the support plate 110. As an example, the bus bar 120 may include a first portion 121, a second portion 122, and a third portion 123.

Here, the first portion 121 may be a portion completely buried inside the support plate 110, the third portion 123 may be a portion exposed to the outside of the support plate 110, and the second portion 122 may be a portion fixed through the support plate 110 while connecting the first portion 121 and the third portion 123.

When the inside and/or a portion of the support plate 110 includes the portion formed of a plastic material having a heat dissipation property and an insulation property, the first portion 121 of the bus bar 120 may be buried inside the support plate 110 to come into contact with the above-described portion formed of the plastic material having a heat dissipation property and an insulation property. Detailed descriptions of the above will be described later.

Meanwhile, as described above, the bus bars 120 may be formed of a conductor having low impedance and large current capacity. As a specific example, the bus bars 120 may be formed of a metal material such as copper or aluminum.

Figure 12:
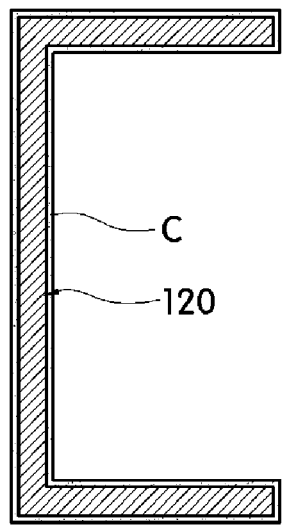
FIG. 12 is a cross-sectional view illustrating the bus bars applicable to the power relay assembly according to one embodiment of the present invention, and is a view illustrating a case in which a coating layer is formed on a surface.

Here, in a case in which the bus bars 120 are formed of an aluminum material, as shown in FIG. 12, each of the bus bars 120 may have a form in which a heat dissipation coating layer C is formed on surfaces thereof and the heat dissipation coating layer C may be the same as a protective coating layer 150 including an insulating heat dissipation filler which will be described later. That is, the bus bar 120 formed of an aluminum material may have a lighter weight than the bus bar 120 formed of a copper material because aluminum has a lower specific gravity than copper, due to the characteristics of the materials. Accordingly, the power relay assembly in which aluminum is used for the material of the bus bars 120 may have a much lighter weight than the power relay assembly in which copper is used for the material of the bus bars 120.

However, since aluminum has a lower heat conductivity than copper, due to the characteristics of the materials, when both are manufactured in the same size, the bus bar made of aluminum may have inferior heat dissipation performance and should be manufactured in a large thickness to realize heat dissipation performance similar to that of the bus bar made of copper.

In the present invention, to this end, in a case in which the bus bars 120 are formed of an aluminum material, the heat dissipation coating layer C including the insulating heat dissipation filler may be formed on the surface of the bus bar 120 to supplement the heat dissipation performance, and thus heat dissipation performance similar to that of the bus bar formed of a copper material may be realized even when the thickness minimally increases compared to when the bus bars are formed of a copper material.

Accordingly, the power relay assembly in which aluminum is used for the material of the bus bars 120 may be lightened compared to the power relay assembly in which copper is used for the material of the bus bars 120, and manufacturing costs may be reduced.

As a non-limiting example, the bus bar formed of an aluminum material should have a thickness about 1.5 times that of the bus bar formed of a copper material having the same shape to realize similar heat dissipation performance. However, in a case in which the heat dissipation coating layer C including the insulating heat dissipation filler is formed on the surface of the bus bar, the bus bar formed of an aluminum material and having the heat dissipation coating layer C including the insulating heat dissipation filler formed on the surface thereof may realize heat dissipation performance similar to that of the bus bar formed of a copper material even when having a thickness 1.3 times that of the bus bar formed of a copper material.

However, the material used for the bus bar 120 is not limited thereto and any conductor having low impedance and large current capacity may be used without limitation.

The cover 130 may protect the electrical elements 10, 20, and 30 and the bus bars 120 from an external environment by preventing the exposure of the electrical elements 10, 20, and 30 and the bus bars 120 configured to protrude from one surface of the support plate 110 to the outside.

The above-described cover 130 may be directly fastened to the support plate 110 and may also be fastened to brackets (not shown) separately provided on an edge of the support plate 110. Further, the cover 130 may have a box shape of which one side is open.

Figure 13:
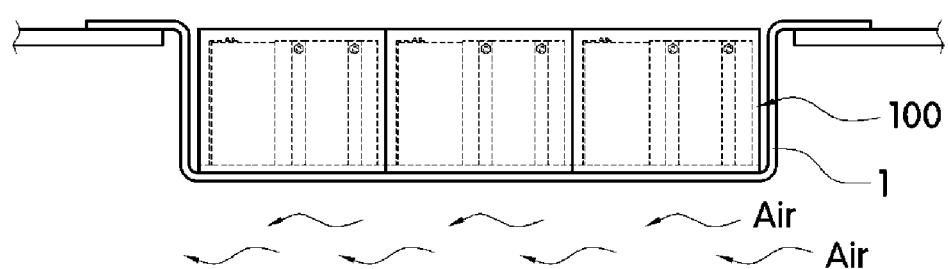
FIG. 13 is a schematic view illustrating a state in which the power relay assembly according to one embodiment of the present invention is mounted in a case of an electric vehicle.
Figure 14:
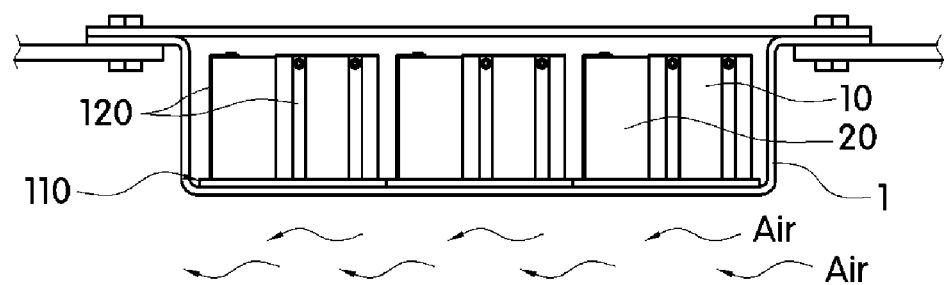
FIG. 14 is a schematic view illustrating a state in which the power relay assembly according to one embodiment of the present invention is mounted in the case of the electric vehicle and sealed by one cover.

However, the cover 130 is not limited thereto, and the cover 130 may be formed of one member, and a plurality of components may also be assembled together to configure one box. Further, as shown in FIGS. 1 and 13, the cover 130 may cover one support plate 110, and as shown in FIG. 14, the cover 130 may have a form which simultaneously covers a plurality of support plates 110 disposed adjacent to each other using one cover 130.

In addition, the cover 130 may be formed of a general plastic material having an insulation property but at least a part of the cover 130 may be formed of a plastic material having a heat dissipation property and an insulation property like the support plate 110.

The electromagnetic wave shielding unit may prevent a malfunction of and damage to electronic components due to the electromagnetic waves. Accordingly, the power relay assembly 100 according to one embodiment of the present invention may prevent problems such as the malfunction of and damage to the electronic components due to the electromagnetic waves through the electromagnetic wave shielding unit while preventing performance degradation and component damage due to the heat through the support plate 110 to which a heat dissipation property is added.

The above-described electromagnetic wave shielding unit may be provided on the support plate 110, and may also be provided at the cover 130 side.

As a specific example, as shown in FIGS. 4 to 7, the electromagnetic wave shielding unit may be a plate-like metal member 140 buried in the support plate 110 or 210.

In this case, the metal member 140 may be a sheet-like plate material, and may also be a metal net.

The above-described metal member 140 may be buried in a portion formed of a plastic material having an insulation property and a heat dissipation property among the support plate 110 or 210 to prevent an electrical short circuit. As an example, the metal member 140 may have a form which is integrated with the portion formed of a plastic material having an insulation property and a heat dissipation property among the support plate 110 or 210 through insert injection-molding.

Accordingly, the support plates 110 and 210 shown in FIGS. 4 to 7 may realize an electromagnetic wave shielding function and have improved mechanical strength through the metal member 140 even when formed of a plastic material. Further, even though the support plates 110 and 210 are formed of an injection molding material, the support plates 110 and 210 may be realized with a thin thickness because mechanical strength may be improved through the metal member 140.

In the present invention, the metal member 140 may be used without limitation as long as it is made of a metal material having predetermined thermal conductivity. As a non-limiting example, the metal member 140 may be one metal selected from the group consisting of aluminum, magnesium, iron, titanium, and copper or an alloy including at least one of these metals.

Figure 4:
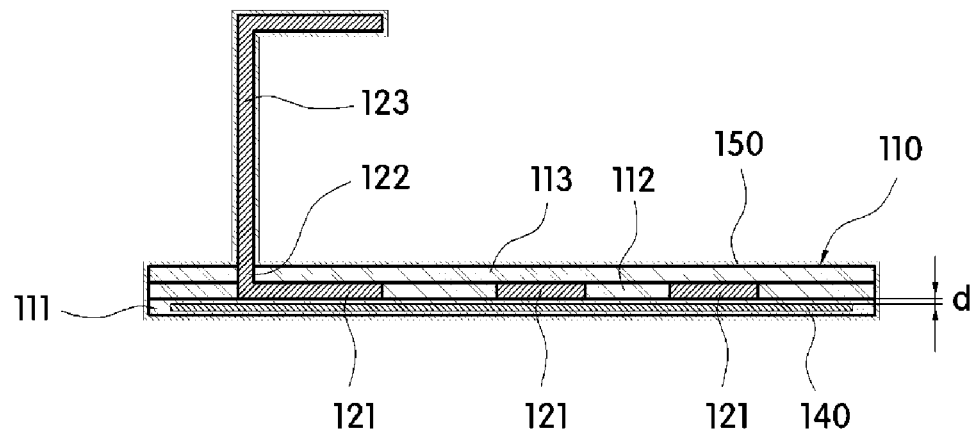
FIG. 4 is a cross-sectional view in direction B-B in FIG. 2.
Figure 5:
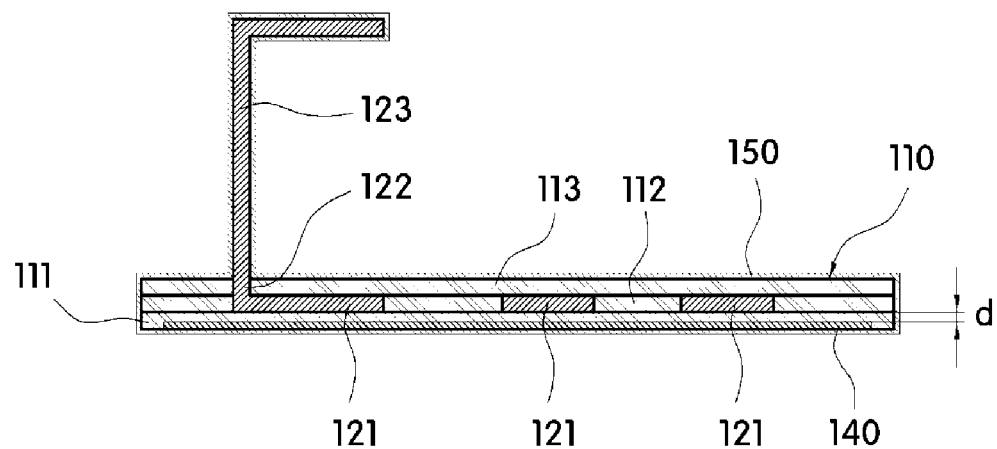
FIGS. 5 to 7 are views illustrating a case in which an electromagnetic wave shielding unit is provided as a metal member in the power relay assembly according to one embodiment of the present invention, and are cross-sectional views illustrating various shapes of the support plate viewed from the same direction as that in FIG. 4.
Figure 6:
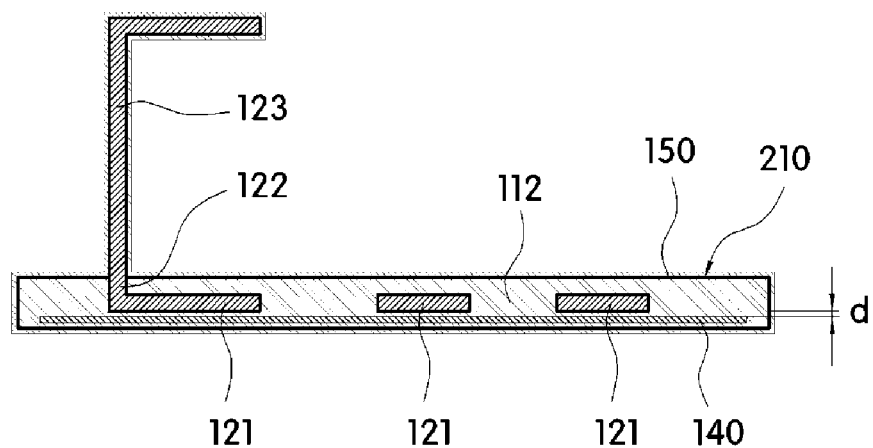
Figure 7:
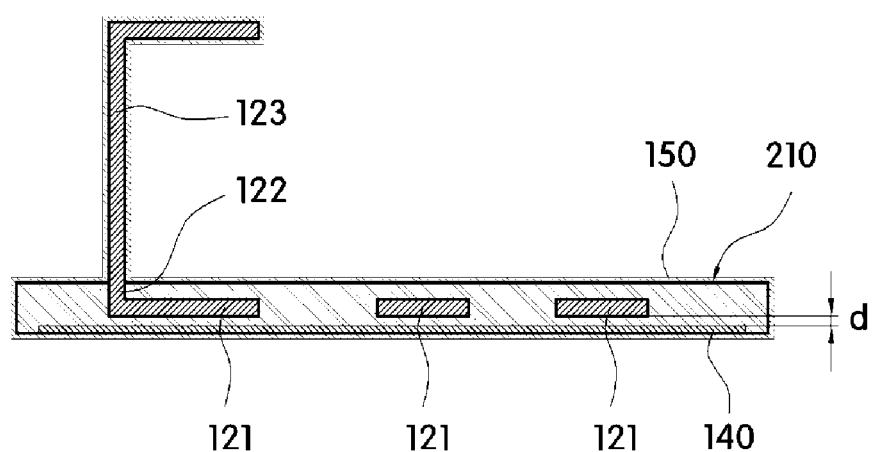

As shown in FIGS. 4 and 6, the metal member 140 may be buried inside the support plate 110 or 210 so that the entire surface is completely surrounded by a portion formed of the plastic material having a heat dissipation property and an insulation property, or as shown in FIGS. 5 and 7, the metal member 140 may be disposed on a lower surface of the support plate 110 or 210 so that one surface is exposed to the outside while coming into contact with a portion formed of the plastic material having a heat dissipation property and an insulation property.

Meanwhile, in a case in which the metal member 140 is integrated with the support plate 110 or 210 through insert injection-molding, the metal member 140 may be surface-treated so that an interface with the support plate 110 or 210 formed of the plastic material having an insulation property and a heat dissipation property is not separated. Accordingly, the support plate 110 or 210 may increase a coupling force between the metal member 140 and the portion formed of the plastic material having a heat dissipation property and an insulation property. Alternatively, a nano-sized fine groove having a predetermined pattern may be formed in at least one surface of the metal member 140 to improve a bonding force between the metal member 140 and the portion formed of the plastic material having a heat dissipation property and an insulation property.

Meanwhile, in a case in which the support plate 110 or 210 includes the metal member 140 configured to serve as the electromagnetic wave shielding unit, the metal member 140 may be disposed to maintain a predetermined interval d from an end portion of the bus bar 120 which at least a portion thereof comes into contact with the support plate 110 or 210.

As a specific example, a separation distance d between the metal member 140 and the portion 121 of the bus bar 120 which comes into contact with the support plate 110 or 210 may be 1 mm or more, to maintain the insulation property and satisfy a desired withstand voltage property.

In the present invention, as described above, the metal member 140 may be a plate-like metal plate having a predetermined area. However, the metal member 140 is not limited thereto, and may be provided in a bar shape having a predetermined aspect ratio. Further, the metal member 140 may also be a mesh type having a closed loop-shaped edge such as a quadrangular or circular edge and in which a plurality of wires or bars are disposed to be spaced apart from each other at a predetermined interval on the inside of the edge. In a case in which the metal member 140 is the mesh type, the plurality of wires or bars disposed on the inside of the edge may be disposed to form a parallel structure, a lattice structure, a honeycomb structure, and various structures in which they are combined.

Meanwhile, in a case in which the support plate 110 or 210 includes the metal member 140 configured to serve as the electromagnetic wave shielding unit, the metal member 140 may be connected to a ground terminal (earth terminal) through a cable.

Figure 8:
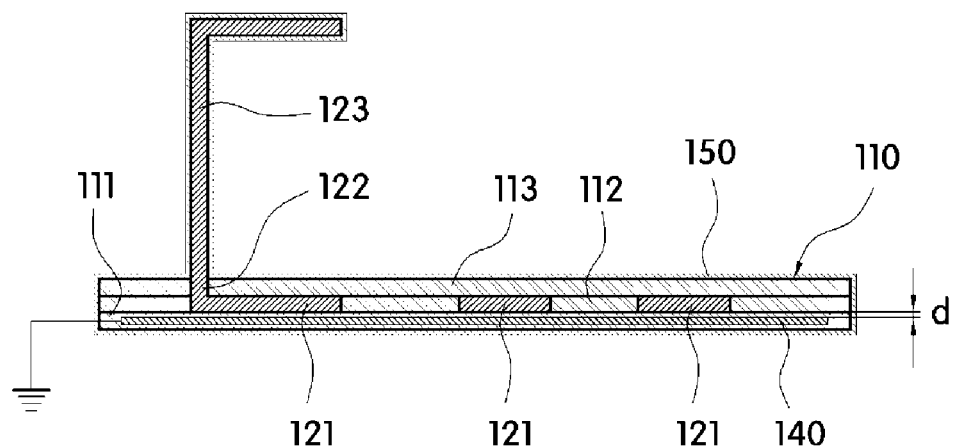
FIG. 8 is a view conceptually illustrating a case in which the metal member in FIG. 4 is connected to the ground.

As an example, as shown in FIG. 8, the metal member 140 entirely buried in the support plate 110 may be connected to a ground terminal (earth terminal) through a cable. Accordingly, the electromagnetic waves absorbed through the metal member 140 may move to the ground through the cable and the ground terminal to further improve electromagnetic wave shielding performance. Although the drawings and descriptions show and describe that the metal member 140 is connected to the ground terminal through the cable to improve electromagnetic wave shielding performance, the present invention is not limited thereto, and the metal member 140 may be used without limitation as long as it is capable of discharging the electromagnetic waves absorbed through the metal member 140 to the outside. Further, although the drawings show that a form shown in FIG. 4 is connected to the ground terminal through the cable, the present invention is not limited thereto, and the same manner may be applied to the support plates 110 and 210 shown in FIGS. 5 to 7.

Figure 9:
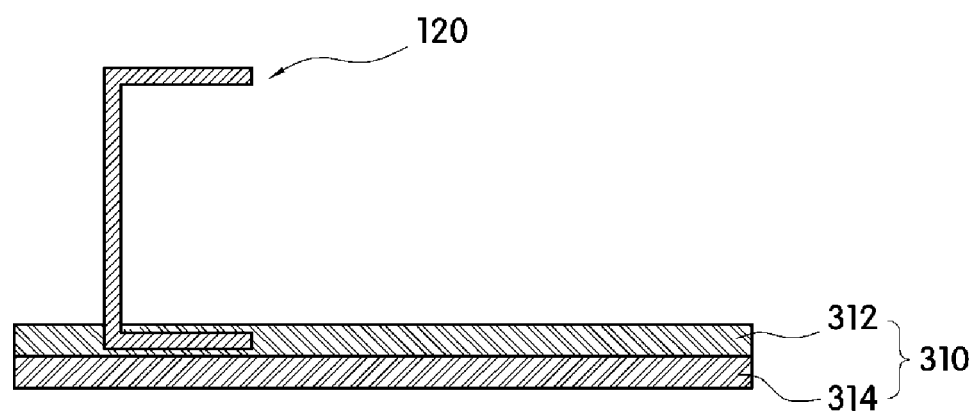
FIGS. 9 and 10 are views illustrating other shapes of the electromagnetic wave shielding unit in the power relay assembly according to one embodiment of the present invention, and are cross-sectional viewed from the same direction as that in FIG. 4
Figure 10:
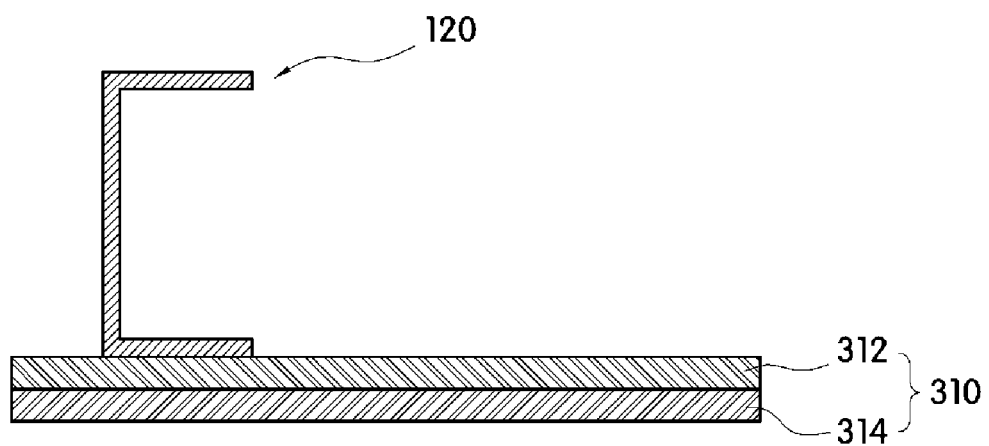

As another example, the electromagnetic wave shielding unit may be implemented in forms shown in FIGS. 9 and 10. That is, in the embodiment, since a portion of a support plate 310 includes an electrically conductive component, the electromagnetic wave shielding unit may realize the electromagnetic wave shielding function.

For this end, the support plate 310 may include a plate-like first plate 312 and a plate-like second plate 314 stacked on each other. In this case, the first plate 312 may be formed of a plastic material having a heat dissipation property and an insulation property, and the second plate 314 may be formed of a plastic material having a heat dissipation property and a non-insulation property. Further, the second plate 314 may include an electrically conductive filler to realize the electromagnetic wave shielding function.

In this case, the second plate 314 may constitute a portion of the support plate 310 and serve as the electromagnetic wave shielding unit.

Specifically, the first plate 312 may be provided in a form in which an insulating heat dissipation filler is dispersed in a polymer matrix to have a heat dissipation property and an insulation property, and the second plate 314 may be provided in a form in which a heat dissipation filler and an electrically conductive filler are dispersed in the polymer matrix.

In this case, the first plate 312 and the second plate 314 may be injection-molded products formed through injection-molding, and the support plate 310 may be provided in a form in which the first plate 312 and the second plate 314 are integrated through heterogeneous injection.

In this case, the bus bar 120 may be disposed to come into contact with the first plate 312 having a heat dissipation property and an insulation property in the support plate 310.

That is, a portion of the bus bar 120 may be buried in the first plate 312 as shown in FIG. 9, or one surface of the bus bar 120 may be fixed in contact with one surface of the first plate 312 as shown in FIG. 10.

Accordingly, since a portion of the bus bar 120 may come into contact with and may be fixed to the first plate 312 having an insulation property even when a portion of the bus bar 120 is fixed to support plate in a contact state, the support plate 310 in one embodiment may prevent an electrical short circuit and may smoothly absorb and block the electromagnetic waves through the second plate 314.

Here, the polymer matrix configuring the first plate 312 and the second plate 314 may be used without limitation when implemented as a polymer compound which does not hinder dispersibility of the heat dissipation filler and may be injection-molded. Further, the polymer matrix may be used without limitation as long as adhesion between different materials is not limited and satisfactory adhesion may be realized.

As a specific example, the polymer matrix may be a known thermoplastic polymer compound, and the thermoplastic polymer compound may be a compound selected from the group consisting of polyamide, polyester, polyketone, a liquid crystal polymer, polyolefin, polyphenylene sulfide (PPS), polyether ether ketone (PEEK), polyphenylene oxide (PPO), polyethersulfone (PES), polyetherimide (PEI), and polyimide or a mixture of at least two among the above group or copolymer.

Further, the insulating heat dissipation filler included in the first plate 312 may be used without limitation as long as it has both an insulation property and a heat dissipation property. As a specific example, the insulating heat dissipation filler may include at least one selected from the group consisting of magnesium oxide, titanium dioxide, aluminum nitride, silicon nitride, boron nitride, aluminum oxide, silica, zinc oxide, barium titanate, strontium titanate, beryllium oxide, silicon carbide, and manganese oxide. In this case, the insulating heat dissipation filler may be porous or nonporous, and may also be a core-shell type filler in which a known conductive heat dissipation filler such as a carbon-based filler, a metal filler, or the like is used as a core and an insulating component surrounds the core. Further, in the case of the insulating heat dissipation filler, a surface may be modified with a functional group such as a silane group, an amino group, a hydroxyl group, a carboxyl group, or the like to improve an interfacial bonding force with the polymer matrix by improving wettability or the like.

In addition, the electrically conductive filler included in the second plate 314 may be used without limitation in the case of known electrically conductive fillers. As an example, the electrically conductive filler may include at least one of one or more metals selected from the group consisting of aluminum, nickel, copper, silver, gold, chromium, platinum, a titanium alloy, and stainless steel, and an electrically conductive polymer compound. In this case, the electrically conductive polymer compound may include at least one selected from the group consisting of polythiophene, poly (3,4-ethylenedioxythiophene), polyaniline, polyacetylene, polydiacetylene, polythiophenevinylene, polyfluorene and poly (3,4-ethylenedioxythiophene) (PEDOT): polystyrene sulfonate (PSS).

In the embodiment, although the drawings show that the first plate 312 and the second plate 314 are provided in the same shape, the present invention is not limited thereto, and the first plate 312 and the second plate 314 may be implemented in a manner in which the first plate 312 and the second plate 314 are stacked on each other and an edge of the second plate 314 surrounds an edge of the first plate 312, or may be implemented in a manner in which the first plate 312 and the second plate 314 are stacked on each other and the edge of the first plate 312 surrounds the edge of the second plate 314.

Figure 11:
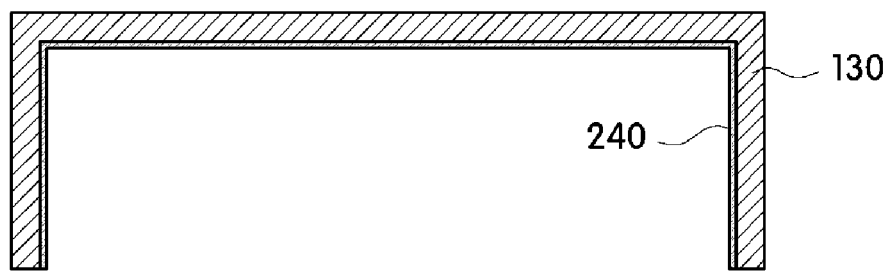
FIG. 11 is a cross-sectional view illustrating a cross-section of a cover applicable to the power relay assembly according to one embodiment of the present invention viewed from the same direction as direction A-A in FIG. 1, and is a view illustrating a case in which the electromagnetic wave shielding unit is formed on an inner surface of the cover as a shielding coating layer.

As another example, as shown in FIG. 11, the electromagnetic wave shielding unit may be provided on one surface of the cover 130. That is, in the embodiment, the electromagnetic wave shielding unit may be a shielding coating layer 240 having electrical conductivity and formed with a predetermined thickness on an inner surface of the cover 130 to shield the electromagnetic waves, and the shielding coating layer 240 may be a polymer resin layer including an electrically conductive filler or a deposition layer in which a metal material is deposited.

Here, the polymer resin layer including an electrically conductive filler may be provided in a form in which the electrically conductive filler is dispersed in a known thermosetting polymer compound or a known thermoplastic polymer compound. Further, the electrically conductive filler may include at least one of one or more metals selected from the group consisting of aluminum, nickel, copper, silver, gold, chromium, platinum, a titanium alloy, and stainless steel, and an electrically conductive polymer compound. In this case, the electrically conductive polymer compound may include at least one selected from the group consisting of polythiophene, poly (3,4-ethylenedioxythiophene), polyaniline, polyacetylene, polydiacetylene, polythiophenevinylene, polyfluorene and poly (3,4-ethylenedioxythiophene) (PEDOT): polystyrene sulfonate (PSS).

Further, the deposition layer may be applied without limitation as long as it is formed of a metal material which can be deposited such as aluminum, nickel, copper, silver, gold, chromium, platinum, a titanium alloy, stainless steel or the like.

In the embodiment, the shielding coating layer 240 may be formed only on the inner surface of the cover 130 but is not limited thereto, and may be coated on an outer surface of the cover 130 or coated on both the inner surface and outer surface of the cover 130. Further, the shielding coating layer 240 may be partially formed on some of the area of the cover 130, and may also be formed on an entire area of the cover 130.

In addition, the shielding coating layer 240 may be a metal thin film layer, in which a thin metal plate is attached through an adhesive layer, in addition to the coating layer or the deposition layer.

Meanwhile, in the power relay assembly 100 according to one embodiment of the present invention, the support plate 110 or 210 may be variously implemented when the electromagnetic wave shielding unit is implemented as the plate-like metal member 140.

As an example, as shown in FIGS. 1 to 5, the support plate 110 may include a first plate 111, a second plate 112, and a third plate 113 each having a plate shape. In this case, the first plate 111, the second plate 112, and the third plate 113 may be sequentially stacked, and at least the first plate 111 among the first plate 111, the second plate 112, and the third plate 113 may be formed of a plastic material having a heat dissipation property and an insulation property.

Figure 2:
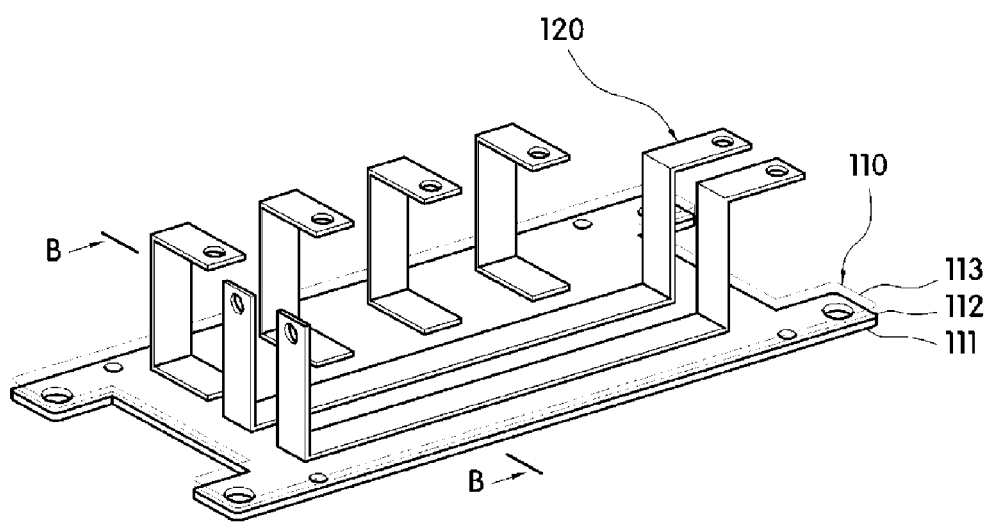
FIG. 2 is a view illustrating a state in which electrical elements are removed in FIG. 1, and is a view illustrating an arrangement relation of bus bars.
Figure 3:
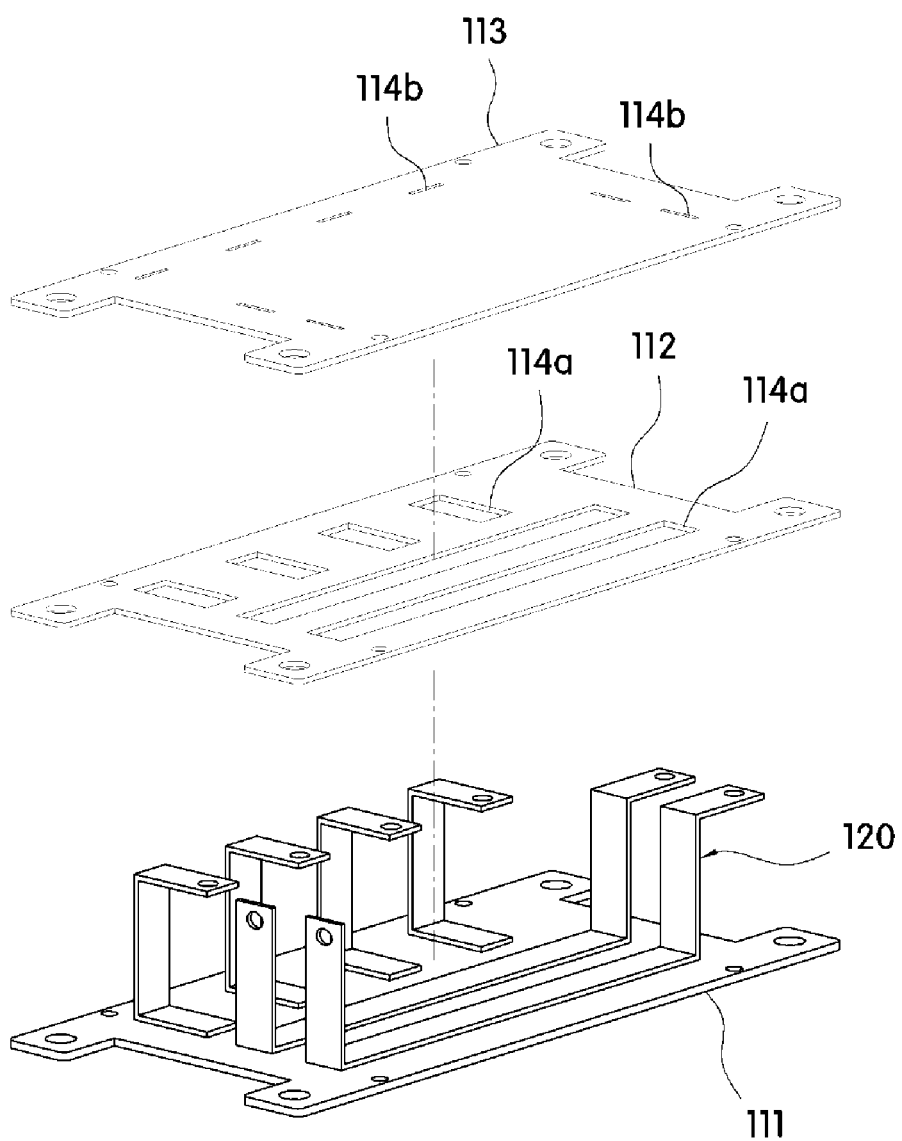
FIG. 3 is a view illustrating a state in which a first plate, a second plate, and a third plate are separated in FIG. 2.

In this case, as shown in FIGS. 2 and 3, the second plate 112 and the third plate 113 may include arrangement holes 114a and 114b, having shapes corresponding to the first portion 121 and the second portion 122 of the bus bar 120 buried in the support plate 110, respectively, and the arrangement holes 114a and 114b may be formed through the second plate 112 and the third plate 113, respectively. In this case, the shapes of the arrangement holes 114a and 114b may be appropriately changed according to the shapes of the first portion 121 and the second portion 122 of the bus bar 120 buried in the support plate 110.

Accordingly, heat generated when the electrical elements 10, 20, and 30 and the bus bars 120 are operated may be transferred to the outside after being transferred to the first plate 111 having a heat dissipation property. Further, the bus bar 120 may be fixed by the second plate 112 and the third plate 113 in a state in which the second portion 122 is buried in the support plate 110. Accordingly, in the power relay assembly 100 according to the embodiment, since separate fixing members configured to fix the bus bars 120 to the support plate 110 are not necessary, a space may be efficiently used and the assembly process may be simplified.

Here, the first plate 111, the second plate 112, and the third plate 113 which are sequentially stacked may be attached to each other by an adhesive member (not shown). In this case, although a general adhesive member may be used as the adhesive member, preferably, a heat dissipation adhesive member including a thermally conductive filler may be used. Further, the first plate 111, the second plate 112, and the third plate 113 may be attached to each other through a known heat transferring material (not shown) such as a Tim. In addition, the first plate 111, the second plate 112, and the third plate 113 may be in a form fixed by a fastening member (not shown) such as a bolt member after being sequentially stacked.

Meanwhile, in a case in which the support plate 110 is formed to be separated into the first plate 111, the second plate 112, and the third plate 113, the first plate 111 may be formed of a plastic material having a heat dissipation property and an insulation property, and the second plate 112 and the third plate 113 may be formed of a general plastic material having an insulation property.

In this case, heat transferred to the first plate 111 having a heat dissipation property through the bus bars 120 may be prevented from being transferred in a vertical direction by the second plate 112 and/or the third plate 113 stacked on an upper portion of the first plate 111. Accordingly, the heat transferred to the first plate 111 may be prevented from being transferred to the electrical elements 10, 20, and 30 through the second plate 112 and/or the third plate 113.

Accordingly, since a heat dissipation path of heat generated from the bus bars 120 may be concentrated at the first plate 111, heat dissipation performance may be improved.

Further, as shown in FIGS. 13 and 14, in a case in which external air comes into contact with a lower side of the case 1 in a natural convection manner or a forced convection manner in a state in which one power relay assembly 100 or a plurality of power relay assemblies 100 according to the present invention are disposed in a box-like case 1, in the power relay assembly 100, the heat generated from the electrical elements 10, 20, and 30 and/or the bus bars 120 may be concentrated at the first plate 111 configured to directly come into contact with the case 1 and may thus be more efficiently dissipated.

Meanwhile, in a case in which the support plate 110 is formed to be separated into the first plate 111, the second plate 112, and the third plate 113, the second plate 112 and the third plate 113 may be formed of a plastic material having a heat dissipation property and an insulation property like the first plate 111. That is, the support plate 110 may be entirely formed of a plastic material having a heat dissipation property. In this case, since an overall heat capacity of the support plate 110 increases, heat dissipation performance may be further improved in comparison with when only the first plate 111 is formed of the plastic material having a heat dissipation property and an insulation property.

Alternatively, as shown in FIG. 6, the support plate 210 may be an injection-molded product formed of a resin-forming composition having a heat dissipation property and an insulation property.

That is, the support plate 210 may be entirely formed of a plastic material having a heat dissipation property and an insulation property and the bus bar 120 may be provided in a form which is integrally formed with the support plate 210. Here, at least a portion of the bus bar 120 may be integrated with the support plate 210 in a form buried in the resin-forming composition in a process of molding the support plate 210 through insert-molding using the resin-forming composition, and may be provided in a form in which the first portion 121 and the second portion 122 are buried in the support plate 210.

Accordingly, in the support plate 210 of the embodiment heat dissipation performance may be further improved by increasing the overall heat capacity like the support plate 110 which is formed to be separated into the first plate 111, the second plate 112, and the third plate 113 as described above and in which all of the first plate 111, the second plate 112, and the third plate 113 are formed of the plastic material having a heat dissipation property and an insulation property and since a cumbersome assembly process is omitted, work productivity may be improved.

Meanwhile, the plastic having a heat dissipation property and an insulation property used to form the above-described support plates 110 and 210 may have a form in which an insulating heat dissipation filler is dispersed in the polymer matrix.

As an example, the polymer matrix may be used without limitation when implemented as a polymer compound which may not hinder dispersibility of the heat dissipation filler and may be injection-molded. As a specific example, the polymer matrix may be a known thermoplastic polymer compound, and the thermoplastic polymer compound may be a compound selected from the group consisting of polyamide, polyester, polyketone, a liquid crystal polymer, polyolefin, polyphenylene sulfide (PPS), polyether ether ketone (PEEK), polyphenylene oxide (PPO), polyethersulfone (PES), polyetherimide (PEI), and polyimide or a mixture of at least two among the above group or copolymer.

Further, the insulating heat dissipation filler may be used without limitation as long as it has both an insulation property and a heat dissipation property. As a specific example, the insulating heat dissipation filler may include at least one selected from the group consisting of magnesium oxide, titanium dioxide, aluminum nitride, silicon nitride, boron nitride, aluminum oxide, silica, zinc oxide, barium titanate, strontium titanate, beryllium oxide, silicon carbide, and manganese oxide.

Further, the insulating heat dissipation filler may be porous or nonporous, and may also be a core-shell type filler in which a known conductive heat dissipation filler such as a carbon-based filler, a metal filler, or the like is used as the core and an insulating component surrounds the core.

In addition, in the case of the insulating heat dissipation filler, the surface may be modified with a functional group such as a silane group, an amino group, a hydroxyl group, a carboxyl group, or the like to improve an interfacial bonding force with the polymer matrix by improving wettability or the like.

However, the plastic having an insulation property and a heat dissipation property which are usable in the present invention is not limited to the above, and all plastics having both an insulation property and a heat dissipation property may be used without limitation.

Meanwhile, as described above, the bus bars 120 may be at least partially buried in the support plate 110 or 210.

Specifically, as shown in FIGS. 4 to 8, the bus bar 120 may include the first portion 121 buried in the support plate 110 and extending portions 122 and 123 configured to extend from an end portion of the first portion 121.

Further, among the entire length, the extending portions 122 and 123 may include the second portion 122 configured to extend from the end portion of the first portion 121 in a thickness direction of the support plate 110 or 210 and the third portion 123 configured to extend from an end portion of the second portion 122 and protrude toward the outside of the support plate 110 or 210, and the second portion 122 may be buried in the support plate 110 or 210 together with the first portion 121.

Here, the first portion 121 and the second portion 122 buried in the support plate 110 or 210 may be disposed in the arrangement holes 114a and 114b formed through the second plate 112 and the third plate 113 in a case in which the support plate 110 is implemented in a form in which the first plate 111, the second plate 112, and the third plate 113 are stacked.

Accordingly, an upper surface of the first portion 121 buried in the support plate 110 may be covered by the third plate 113 in a state in which a lower surface of the first portion 121 comes into contact with the first plate 111, and in a case in which the first plate 111, the second plate 112, and the third plate 113 are fixedly coupled, the first portion 121 may be fixed through the second plate 112 and the third plate 113. Accordingly, the bus bars 120 may be fixed to the support plate 110 even when separate fixing members are not used.

Further, at least the first portion 121 among the first portion 121 and the second portion 122 buried in the support plate 110 may be disposed to directly come into contact with the first plate 111 formed of the plastic material having a heat dissipation property and an insulation property.

Alternatively, as described above, in a case in which the bus bar 120 is entirely formed of the plastic material having a heat dissipation property and an insulation property, the bus bar 120 may be insert-molded in a state of being at least partially buried in the resin-forming composition in a process of insert-molding the bus bar 120 using the resin-forming composition, and thus may have a form in which the first portion 121 and the second portion 122 are buried in the support plate 210.

The drawings show that each of the extending portions 122 and 123 configured to extend from the first portion 121 numbers one but the present invention is not limited thereto, and each of the extending portions 122 and 123 may number more than one.

Further, as shown in FIG. 10, the bus bar 120 may be provided in a form in which one surface is fixed to one surface of the support plate 210, and may be fixed to the exposed one surface of the support plate 110 shown in FIGS. 4 to 8 in the same manner as in FIG. 10.

In addition, in a case in which a portion of the bus bar 120 is buried in the support plate 110 or 210, known heat transferring materials (not shown) may be provided on outer surfaces of the first portion 121 and the second portion 122 of the bus bar 120 buried in the support plate 110 or 210. The above-described heat transferring materials may easily transfer heat present in the bus bars 120 to the support plate 110 or 210 having a heat dissipation property.

Meanwhile, the power relay assembly 100 according to one embodiment of the present invention may further include the protective coating layer 150.

As shown in FIG. 4, the protective coating layer 150 may be coated to cover all outer surfaces of the support plate 110 or 210 and the bus bars 120. Further, the protective coating layer 150 may also cover all outer surfaces of the electrical elements 10, 20, and 30 mounted on one surface of the support plate 110 or 210. However, a coating location of the protective coating layer 150 is not limited thereto, and the protective coating layer 150 may be coated on only the outer surfaces of the support plate 110 or 210 or coated on only the outer surfaces of the bus bars 120.

The above-described protective coating layer 150 may prevent scratches due to physical stimuli applied to the surfaces of the support plate 110 or 210 and the bus bars 120 and further improve an insulation property of the surfaces.

Further, in a case in which the support plate 110 or 210 is formed of plastic in which the insulating heat dissipation filler is dispersed, the protective coating layer 150 may also serve to prevent separation of the insulating heat dissipation filler located at the surfaces of the support plate 110 or 210.

As an example, the protective coating layer 150 may be implemented as a known thermosetting polymer compound or thermoplastic polymer compound. The thermosetting polymer compound may be a compound selected from the group consisting of an epoxy-based resin, a urethane-based resin, an ester-based resin, and a polyimide-based resin, or a mixture or copolymer of at least two in the above group. Further, the thermoplastic polymer compound may be a compound selected from the group consisting of polyamide, polyester, polyketone, a liquid crystal polymer, a polyolefin, polyphenylene sulfide (PPS), polyether ether ketone (PEEK), polyphenylene oxide (PPO), polyethersulfone (PES), polyetherimide (PEI), and polyimide or a mixture of at least two among the above group or copolymer, but may not be limited thereto.

Meanwhile, the protective coating layer 150 coated on the outer surface of the support plate 110 or 210 may hinder emission of heat transferred to the support plate 110 to the outside. To solve this problem, the protective coating layer 150 applied to the present invention may further include an insulating heat dissipation filler to improve the characteristic of dissipating heat to the outside. The insulating heat dissipation filler may be used without limitation in the case of known insulating heat dissipation fillers.

As an example, the protective coating layer 150 may include an insulating heat dissipation filler dispersed in the polymer matrix to have both a heat dissipation property and an insulation property like the above-described support plates 110 and 210.

In this case, the insulating heat dissipation filler included in the protective coating layer 150 may be the same as the insulating heat dissipation filler included in the support plate 110 or 210 and different from the insulating heat dissipation filler included in the support plate 110 or 210.

The plurality of electrical elements 10, 20, and 30 may be mounted on one surface of the support plate 110, 210, or 310 and may be electrically connected to each other through the bus bar 120. Accordingly, the electrical elements 10, 20, and 30 may serve to block or connect the high-voltage current supplied from the battery to the driving control part side.

The above-described electrical elements 10, 20, and 30 may be main relays, pre-charge relays, pre-charge resistors, battery current sensors, main fuses, and the like and may be electrically connected to each other through the bus bar 120 or a cable (not shown). Further, the plurality of bus bars 120 may be electrically connected to each other through circuit patterns (not shown) formed in the support plate 110, 210, or 310.

Accordingly, the electrical elements 10, 20, and 30 may supply power to a driving control part (not shown) configured to control a driving voltage by blocking or connecting the high-voltage current supplied from the battery to generate control signals for driving a motor in the driving control part. In this case, the driving control part may generate control signals for driving the motor, and since an inverter and a converter are controlled through the control signals, driving of the motor may be controlled.

As an example, since the main relays are connected and the pre-charge relays are blocked when a vehicle is driven, the power from the battery may be applied to the inverter through a main circuit.

Further, since the main relays become a blocked state and connection between the battery and the inverter is blocked when the vehicle is turned off, a battery voltage may be prevented from being transferred to the motor through the inverter. In this case, when the main relays are blocked, a condenser connected to the inverter may be discharged.

Further, when the vehicle is driven again, since the pre-charge relays are connected and thus the battery voltage is applied to the inverter in a state of being lowered by a pre-charge resistor, charging of the condenser may be started. In addition, when the condenser is sufficiently charged, since the main relays are connected and the pre-charge relays are blocked, the battery voltage may be supplied to the inverter.

Since the operation of the above-described electrical elements is publically known, detailed descriptions thereof will not be provided.

Although one embodiment of the present invention is described above, the spirit of the present invention is not limited to the embodiment shown in the description, and although those skilled in the art may provide other embodiments through the addition, change, or removal of the components within the scope of the same spirit of the present invention, such embodiments are also included in the scope of the spirit of the present invention.

The invention claimed is:

1. A power relay assembly comprising:
   a support plate having at least one electrical element mounted on one surface thereof and including a plastic material having a heat dissipation property and an insulation property;
   at least one bus bar electrically connected to the electrical element; and
   an electromagnetic wave shielding unit configured to shield electromagnetic waves generated from the electrical element,
   wherein at least a portion of the bus bar is buried in the support plate, and wherein the support plate includes a first plate in surface contact with one surface of a first portion of the bus bar, and a second plate and a third plate each having an arrangement hole of a shape corresponding to the portion of the bus bar buried in the support plate, and sequentially stacked on one surface of the first plate.

2. The power relay assembly of claim 1, wherein the electromagnetic wave shielding unit is a plate-like metal member buried in the support plate.

3. The power relay assembly of claim 2, wherein the metal member is disposed to be completely buried inside the support plate.

4. The power relay assembly of claim 2, wherein the metal member is fixed to one surface of the support plate so that one surface thereof is exposed to the outside.

5. The power relay assembly of claim 2, wherein the metal member is disposed on the support plate to have an interval of 1 mm or more from a portion of the bus bar.

6. The power relay assembly of claim 2, wherein a fine groove configured to improve a bonding force with the support plate is formed in a surface of the metal member.

7. The power relay assembly of claim 2, wherein the metal member is electrically connected to the ground through a cable.

8. The power relay assembly of claim 1, further comprising at least one cover configured to prevent exposure of the bus bar to the outside,
wherein the electromagnetic wave shielding unit is a shielding coating layer having electrical conductivity and formed to have a predetermined thickness on an inner surface of the cover.

9. The power relay assembly of claim 8, wherein the shielding coating layer is a coating layer in which a polymer resin containing an electrically conductive filler is coated or a deposition layer in which a metal material is deposited.

10. The power relay assembly of claim 1, wherein:
the first plate is formed of a plastic material having a heat dissipation property and an insulation property, and the second plate is formed of a plastic material having a non-insulation property and a heat dissipation property and including a conductive filler; and
the electromagnetic wave shielding unit is the second plate.

11. The power relay assembly of claim 1, wherein the bus bar is disposed so that the at least a portion of the bus bar buried in the support plate comes into contact with a portion of the support plate formed of the plastic material having a heat dissipation property and an insulation property.

12. The power relay assembly of claim 1, wherein at least the first plate among the first plate, the second plate, and the third plate is formed of plastic having a heat dissipation property and an insulation property.

13. The power relay assembly of claim 1, wherein the support plate is formed by insert-molding a resin-forming composition having a heat dissipation property and an insulation property, and the bus bar is integrated with the support plate in a state in which the portion of the bus bar is buried in the support plate.

* * * * *